United States Patent
Moses et al.

(10) Patent No.: US 7,530,517 B2
(45) Date of Patent: May 12, 2009

(54) DATA STORAGE TAPE CARTRIDGE BRAKE ASSEMBLY

(75) Inventors: Jason E. Moses, Breckenridge, MN (US); James L. Albrecht, Wahpeton, ND (US); Jason D. Hanzlik, Wahpeton, ND (US); Peter A. Ridl, Oakdale, MN (US)

(73) Assignee: Imation Corp., Oakdale, MN (US)

( * ) Notice: Subject to any disclaimer, the term of this patent is extended or adjusted under 35 U.S.C. 154(b) by 343 days.

(21) Appl. No.: 11/517,635

(22) Filed: Sep. 8, 2006

(65) Prior Publication Data

US 2007/0080253 A1 Apr. 12, 2007

Related U.S. Application Data

(60) Provisional application No. 60/717,668, filed on Sep. 16, 2005.

(51) Int. Cl.
*G03B 23/02* (2006.01)
(52) U.S. Cl. .................................. 242/338.1; 242/348
(58) Field of Classification Search ............ 242/338, 242/338.2, 343, 343.1, 343.2, 348, 345, 345.2, 242/611, 338.1; 360/132
See application file for complete search history.

(56) References Cited

U.S. PATENT DOCUMENTS

| | | | |
|---|---|---|---|
| 5,893,527 A * | 4/1999 | Mizutani et al. | 242/348 |
| 6,411,466 B1 * | 6/2002 | Shima et al. | 360/132 |
| 6,745,968 B1 | 6/2004 | Schoettle et al. | |
| 6,913,217 B2 * | 7/2005 | Ishihara | 242/338.1 |
| 6,955,317 B2 * | 10/2005 | Ishihara | 242/338.1 |
| 7,021,578 B2 * | 4/2006 | Hiraguchi | 242/338.1 |
| 7,360,291 B2 * | 4/2008 | Ishihara | 242/348 |
| 2005/0127224 A1 * | 6/2005 | Ishikawa | 242/338.1 |
| 2005/0127225 A1 * | 6/2005 | Ishihara | 242/338.1 |
| 2005/0236506 A1 * | 10/2005 | Fukuda | 242/338.1 |

* cited by examiner

*Primary Examiner*—William A Rivera
(74) *Attorney, Agent, or Firm*—Eric D. Levinson

(57) ABSTRACT

A data storage tape cartridge has a housing, at least one tape reel assembly rotatably disposed within the housing, a storage tape wound about a tape winding surface of the tape reel assembly, and a brake assembly. The brake assembly includes a brake plate and a brake button. When the brake assembly is an unlocked position, a depression in the brake plate mates with a protruding member of the brake button to limit vibration of the brake assembly, thereby limiting noisy vibration of cartridge.

11 Claims, 8 Drawing Sheets

DATA STORAGE TAPE CARTRIDGE BRAKE ASSEMBLY

CROSS-REFERENCE TO RELATED APPLICATION

This Non-Provisional Patent Application claims the benefit of the filing date of U.S. Provisional Patent Application Ser. No. 60/717,668 filed Sep. 16, 2005, entitled "DATA STORAGE TAPE CARTRIDGE BRAKE ASSEMBLY."

THE FIELD OF THE INVENTION

The present invention relates to data storage tape cartridges. More particularly, it relates to a data storage tape cartridge brake assembly, that when disengaged, limits vibration of the brake assembly itself while the cartridge is operating.

BACKGROUND

Data storage tape systems have been used for decades in the computer, audio, and video fields. The data storage tape system includes a tape drive and one or more data storage tape cartridges. In one data storage/drive system, storage tape is driven along a tape path between a first tape reel assembly within the cartridge and a second tape reel assembly within the drive. Regardless of exact form, the data storage tape system continues to be a popular format for recording large volumes of information for subsequent retrieval and use.

With the above in mind, a data storage tape cartridge generally consists of an outer shell or housing maintaining at least one tape reel assembly and a length of magnetic storage tape. The storage tape is wrapped about a hub of the tape reel assembly and is driven through a defined path by a driving system. The housing normally includes a separate cover and a separate base. Together, the cover and the base form an opening (or window) at a forward portion of the housing facilitating access to the storage tape by a read/write head upon insertion of the data storage tape cartridge into the tape drive. The interaction between the storage tape and the head can occur within the housing (i.e., a mid-tape load design) or exterior to the housing (i.e., a helical drive design). Where the head/storage tape interaction is exterior to the housing, the data storage tape cartridge normally includes a single tape reel assembly employing a leader block or similar device. Alternately, where the head/storage tape interaction is within the housing, a dual tape reel cartridge configuration is typically employed.

Regardless of the number of tape reel assemblies associated with a particular data storage tape cartridge, the tape reel assembly (also known as a spool) generally includes a hub and one or more reel flanges. In general, the hub includes a core that defines a tape winding surface. The reel flanges are optional, and if employed, are disposed at opposite ends of the hub. To this end, the flanges have a spacing slightly wider than a width of the storage tape to facilitate winding of the storage tape onto, and off of, the tape winding surface.

With this in mind, some form of a brake mechanism is provided to secure the tape reel assembly within the housing during periods of storage. The brake mechanism is generally movable between a locked (i.e., storage) position, and an unlocked position that permits the tape reel assembly to rotate during read/write processing.

For example, the prior art brake mechanisms are normally provided with engagement teeth, or other high friction surface, configured to mate with a corresponding brake surface of the hub of the tape reel assembly. When the data storage tape cartridge is not engaged with the tape drive (i.e., when the cartridge is being handled), the teeth of the brake mechanism are engaged with the brake surface of the hub to prevent rotation of the tape reel assembly. That is to say, the prior art data storage tape cartridges are designed to prevent the rotation of the tape reel assembly when the cartridge is disengaged from the tape drive such that the storage tape, for example, does not inadvertently unravel from the tape reel assembly.

While the above-described brake mechanism addresses unintended unraveling of the storage tape, it can also vibrate and/or wobble within the cartridge housing during read/write processing. In particular, the mass of the brake button during dynamic read/write processing, is known to vibrate substantially in a fundamental frequency. The vibration is accentuated across other frequencies when rotating portions of the tape reel assembly are eccentric, or imbalanced. In addition, any imbalance in the brake mechanism, or contact of the brake mechanism with the rotating tape reel assembly, induces vibrations that result in audible noise during read/write processing.

Data storage tape cartridges have proven highly desirable in the storage and protection of large volumes of retrievable electronic data. Recent advance in data storage tape cartridges have resulted in larger data storage capacities and faster read/write processing. With this in mind, a need exists to reduce deleterious vibrations in data storage tape cartridges that produce noise.

SUMMARY

One aspect of the present invention is related to a data storage tape cartridge. The data storage tape cartridge includes a housing, at least one tape reel assembly rotatably disposed within the housing, a storage tape wound about a tape winding surface of the tape reel assembly, and a brake assembly. The housing includes a base and a cover that combine to define an enclosed region. In addition, the base defines a central opening. The brake assembly is aligned with the central opening and is nested between the tape reel assembly and the cover. In this regard, the brake assembly includes a brake button and a brake plate. The brake button defines a hub side including a protruding member. The brake plate defines a cover side defining depression. When the brake assembly is an unlocked position, the depression of the brake plate mates with the protruding member of the brake button to limit vibration of the brake assembly.

Another aspect of the present invention is related to a brake assembly for a data storage tape cartridge. The brake assembly includes a brake button defining a convex protruding member, and a brake plate defining a concave depression sized to receive the convex protruding member. In this regard, the concave depression defines a radius of curvature that is greater than a radius of curvature of the convex protruding member.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

Figure 1:
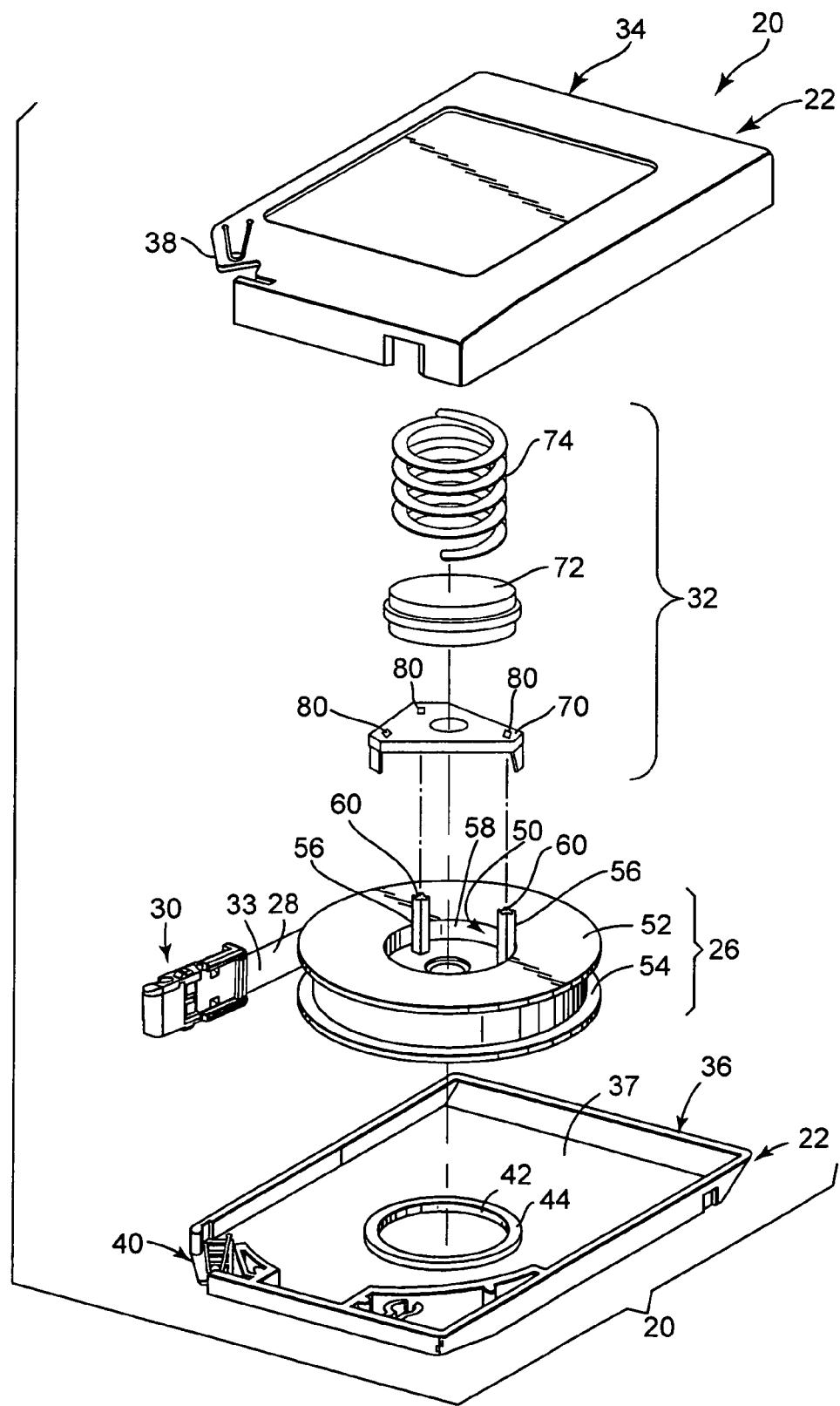
FIG. 1 illustrates a perspective, exploded view of a data storage tape cartridge according to one embodiment of the present invention.

FIG. 1 illustrates an exemplary single reel data storage tape cartridge 20 according to one embodiment of the present invention. Generally, the single reel data storage tape cartridge 20 includes a housing 22, a single tape reel assembly 26, a storage tape 28 coupled to a leader block 30, and a brake assembly 32. The single tape reel assembly 26 is disposed within the housing 22. The storage tape 28, in turn, is wound about the single tape reel assembly 26 and includes a leading end 33 attached to the leader block 30. As a point of reference, while a single reel data storage tape cartridge 20 is shown, the present invention is applicable to other cartridge configurations, such as dual reel cartridge configurations.

The housing 22 is sized for reception by a typical tape drive (not shown). Thus, the housing 22 exhibits a size of approximately 125 mm×110 mm×21 mm, although other dimensions are equally acceptable. With this in mind, the housing 22 is defined by a first housing section 34 and a second housing section 36. In one embodiment, the first housing section 34 forms a cover whereas the second housing section 36 forms a base. As used throughout the Specification, directional terminology such as "cover," "base," "upper," "lower," "top," "bottom," etc., is employed for purposes of illustration and description as related to the particular Figure shown.

The first and second housing sections 34 and 36, respectively, are sized to be reciprocally mated to one another to form an enclosed region 37 and are generally rectangular, except for one corner 38 that is preferably angled and forms a tape access window 40. The tape access window 40 serves as an opening for the storage tape 28 to exit from the housing 22 such that the storage tape 28 can be threaded to a tape drive (not shown) when the leader block 30 is removed from the tape access window 40. Conversely, when the leader block 30 is engaged in the tape access window 40, the tape access window 40 is covered.

In addition to forming a portion of the tape access window 40, the second housing section 36 also forms a central opening 42. The central opening 42 facilitates access to the single tape reel assembly 26 by a drive clutch portion of the tape drive (not shown). A raised ring 44 is formed concentrically about the central opening 42 and is configured to couple with a complementary groove (not shown) formed in the tape reel assembly 26.

The tape reel assembly 26 comprises a hub 50, an upper flange 52 and a lower flange 54. The upper and lower flanges 52, 54 extend in a radial fashion from opposing sides of the hub 50, respectively, and cooperate to retain multiple wraps of the storage tape 28 about the hub 50 and between the flanges 52, 54. In one embodiment, the hub 50 defines a tape winding surface (covered by the storage tape 28) and brake posts 56 extending axially from an interior surface 58 of the hub 50. In one embodiment, a top portion of each of the brake posts 56 defines an engagement surface 60. In another embodiment, the brake posts 56 form walls or wall sections that extend axially from an interior surface 58 of the hub 50.

The storage tape 28 is preferably a magnetic tape of a type commonly known in the art. For example, the storage tape 28 may consist of a balanced polyethylene naphthalate (PEN) based material coated on one side with a layer of magnetic material dispersed within a suitable binder system and coated on the other side with a conductive material dispersed within a suitable binder system. Acceptable magnetic tape is available, for example, from Imation Corp., of Oakdale, Minn.

The leader block 30 covers the tape access window 40 and facilitates retrieval of the storage tape 28. In general terms, the leader block 30 is shaped to conform to the window 40 of the housing 22 and to interact with the tape drive (not shown) by providing a grasping surface for the tape drive to manipulate in delivering the storage tape 28 to the read/write head. In this regard, the leader block 30 can be replaced by other components, such as a dumb-bell shaped pin. More over, the leader block 30, or a similar component, can be eliminated entirely, such as with a dual reel cartridge design.

The brake assembly 32 includes a brake plate 70, a brake button 72, and a spring 74. The brake plate 70 is sized to be received within the hub 50 of the tape reel assembly 26. In particular, the brake plate 70 defines slots 80 that are sized to receive the brake posts 56, such that the brake posts 56 slide within the slots 80. The brake button 72 is sized to be coaxially received by the spring 74, and mate with the brake plate 70 when the brake assembly 32 is disengaged.

When the data storage tape cartridge 20 is idle, the brake button 72 is biased by the spring 74 such that the brake button 72 is engaged with the brake posts 56 of the hub 50 to selectively "lock" the single tape reel assembly 26 against the raised ring 44.

During use, a drive clutch portion of a tape drive (not shown) displaces the brake plate 70 axially upward, thus displacing the brake button 72 axially upward to disengage the brake button 72 from the brake posts 56 of the hub 50. A subsequent further axial upward movement of the drive clutch displaces the tape reel assembly 26 out of engagement with the raised ring 44, prior to rotating the tape reel assembly 26 for access to the storage tape 28. In this manner, the drive clutch compresses the spring 74 such that the brake plate 70 and the brake button 72 are in contact with each other during read/write processing.

Figure 2:
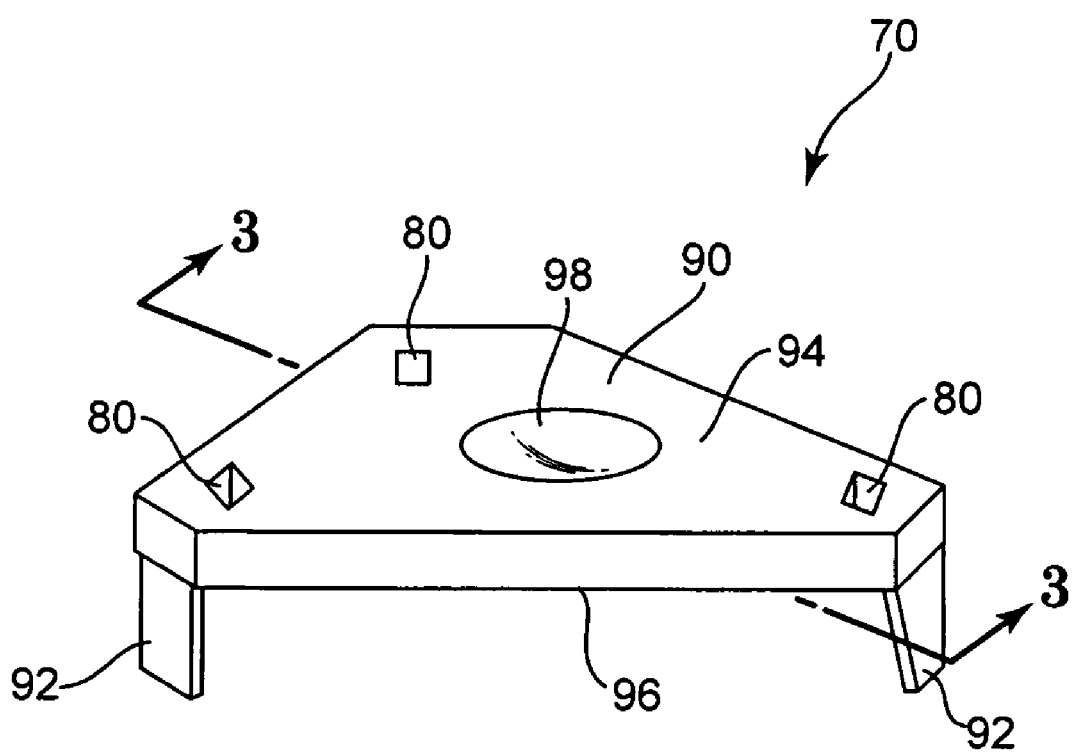
FIG. 2 illustrates a brake plate according to one embodiment of the present invention.

FIG. 2 illustrates a perspective view of the brake plate 70 according to one embodiment of the present invention. The brake plate 70 defines a platen 90 and legs 92 extending from the platen 90. The platen 90 defines a first side 94 and a second side 96. In one embodiment, the first side 94 is a cover side, and the second side 96 is a base side. In addition, the platen 90 defines the slots 80 and a depression 98 on the cover side 94. In one embodiment, the depression 98 is a hemi-spherical depression formed in the cover side 94 of the platen 90.

As a point of reference, the slots 80 project through the platen 90 and are generally sized to slidingly receive the brake posts 56 (FIG. 1). While three slots 80 are illustrated in FIG. 2, it is to be understood that one slot 80 is acceptable, as is an embodiment where more than three slots are defined in the platen 90.

In general terms, the legs 92 extend from the base side 96 of the platen 90. In one embodiment, the platen 90 defines a generally triangular shape and includes three legs 92 extending from the base side 96. As illustrated, the legs 96 are generally oriented and extend from vertices of the triangular platen 90, although other locations for the legs 90 are also acceptable.

In an exemplary embodiment, the brake plate 70 is formed of a durable, non-magnetizing material. For example, the brake plate 70 is preferably formed of polymeric materials that are durable. In one embodiment, the brake plate 70 is formed of Acetal (polyoxymethylene), a high performance engineering polymer, although other polymeric materials, such as nylons and polyesters, are also acceptable.

Figure 3:
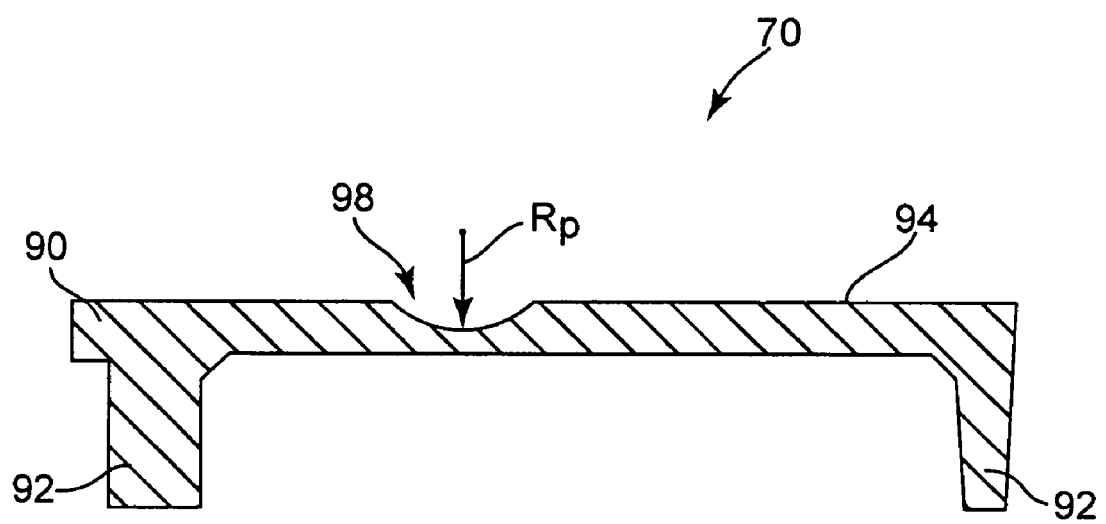
FIG. 3 illustrates a cross-sectional view of the brake plate illustrated in FIG. 2.

FIG. 3 illustrates a cross-sectional view of the brake plate 70 showing the depression 98 according to one embodiment of the present invention. The depression 98 is formed in the cover side 94 of the platen 90, and in one embodiment is concave in hemi-spherical cross-section and defines a radius of curvature $R_P$. In one embodiment, the radius of curvature $R_P$ is between 0.25-2 inch, preferably the radius of curvature $R_P$ is between 0.5-1.5 inch, and more preferably the radius of curvature $R_P$ is approximately 1 inch.

Figure 4:
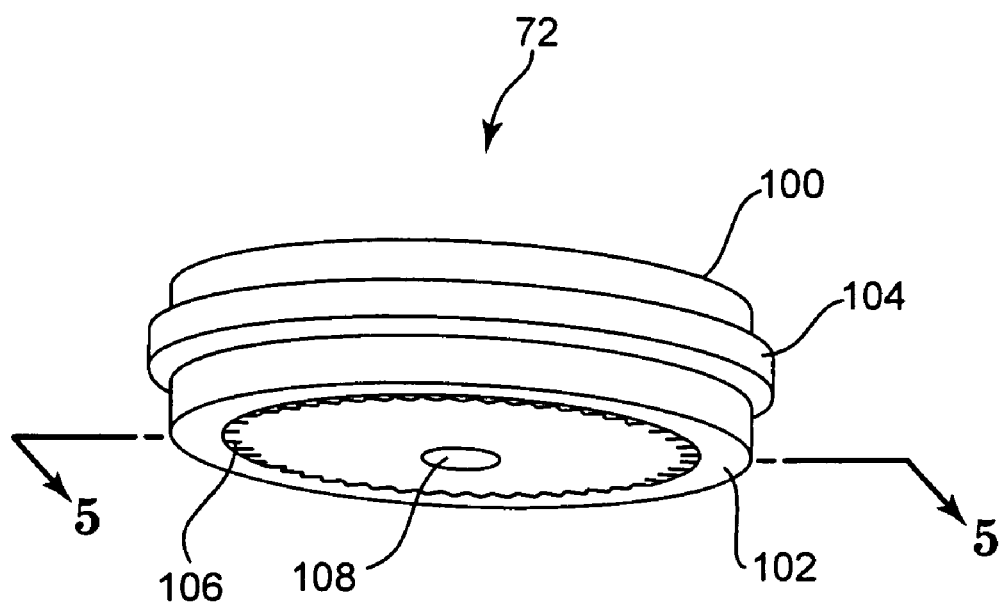
FIG. 4 illustrates a perspective view of a brake button according to one embodiment of the present invention.

FIG. 4 illustrates a perspective view of the brake button 72 according to one embodiment of the present invention. The brake button 72 defines a first side 100 opposite a second side 102, and an optional flange 104 extending radially between the first side 100 and the second side 102. In one embodiment, the first side 100 is a cover side, and the second side 102 is a hub side. In this regard, in one embodiment the hub side 102 of the brake button 72 defines a brake surface 106 and a central protruding member 108.

In general, the brake button 72 is sized to coaxially receive the spring 74 (FIG. 1). In this regard, the spring 74 is mounted circumferentially into the brake button 72 from the first side 100. The brake surface 106 is generally a high friction surface. In one embodiment, the brake surface 106 defines a plurality of teeth configured to frictionally mate with the engagement surface 60 of the brake posts 56 (FIG. 1).

The protruding member 108 extends axially from the hub side 102. In one embodiment, the protruding member 108 defines a convex hemi-spherical protrusion that is centrally located on a central axis of the brake button 72.

In another embodiment, the cover side 94 of the platen 90 defines a protruding member that defines a convex hemi-spherical protrusion centrally located on a central axis of the platen 90, and the hub side 102 of the brake button 72 defines a depression that is concave in hemi-spherical cross-section.

In an exemplary embodiment, the brake button 72 is formed of a durable, non-magnetizing material. For example, the brake button 72 is preferably formed of polymeric materials that are durable. In one embodiment, the brake plate 70 is formed of nylon, such as nylon 6-6, a high performance-engineering polymer, although other polymeric materials, such as Acetal (polyoxymethylene) and polyesters, are also acceptable.

Figure 5:
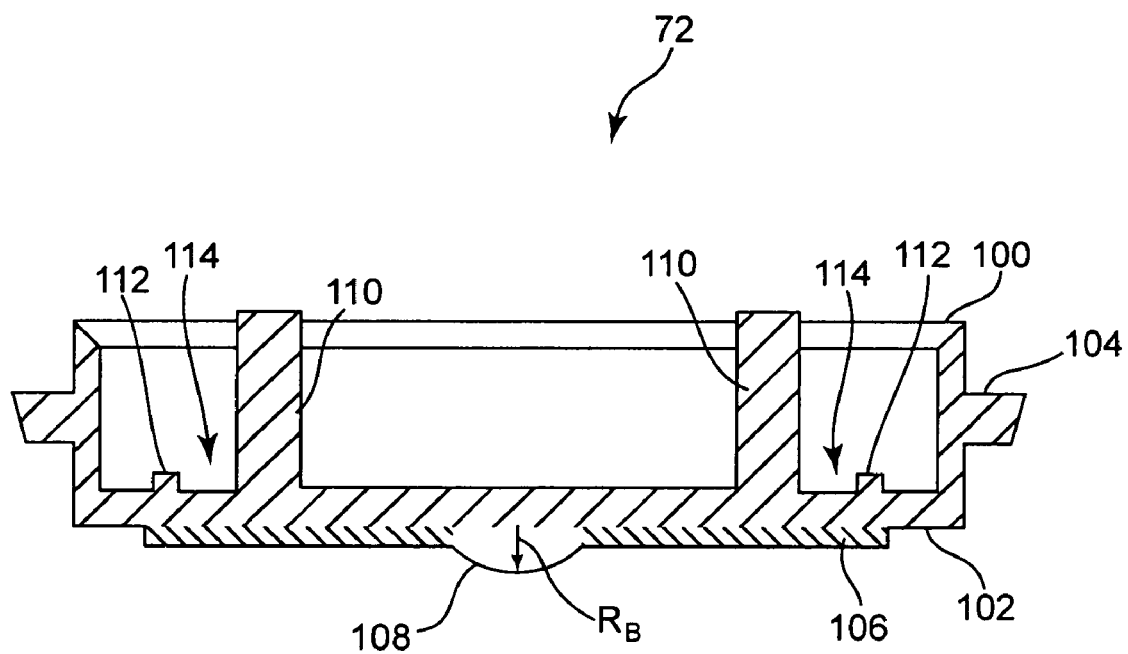
FIG. 5 illustrates a cross-sectional view of the brake button illustrated in FIG. 4.

FIG. 5 illustrates a cross-sectional view of the brake button 72 according to one embodiment of the present invention. In an exemplary embodiment, the brake button 72 defines an interior wall 110 and a detent 112 that together form a spring well 114 sized to receive the spring 74 (FIG. 1). In one embodiment, the detent 112 forms a wall or a wall section that extends radially about an inner surface the brake button 72.

The protruding member 108 extends centrally along a central axis from the hub side 102. In this regard, the convex hemi-spherical protruding member 108 defines a radius $R_B$. In one embodiment, the radius $R_B$ is between 0.06-1 inch, preferably the convex hemi-spherical protruding member 108 defines a radius $R_B$ of between 0.07-0.5 inch, and more preferably the convex hemi-spherical protruding member 108 defines a radius $R_B$ of approximately 0.125 inch.

Figure 6:
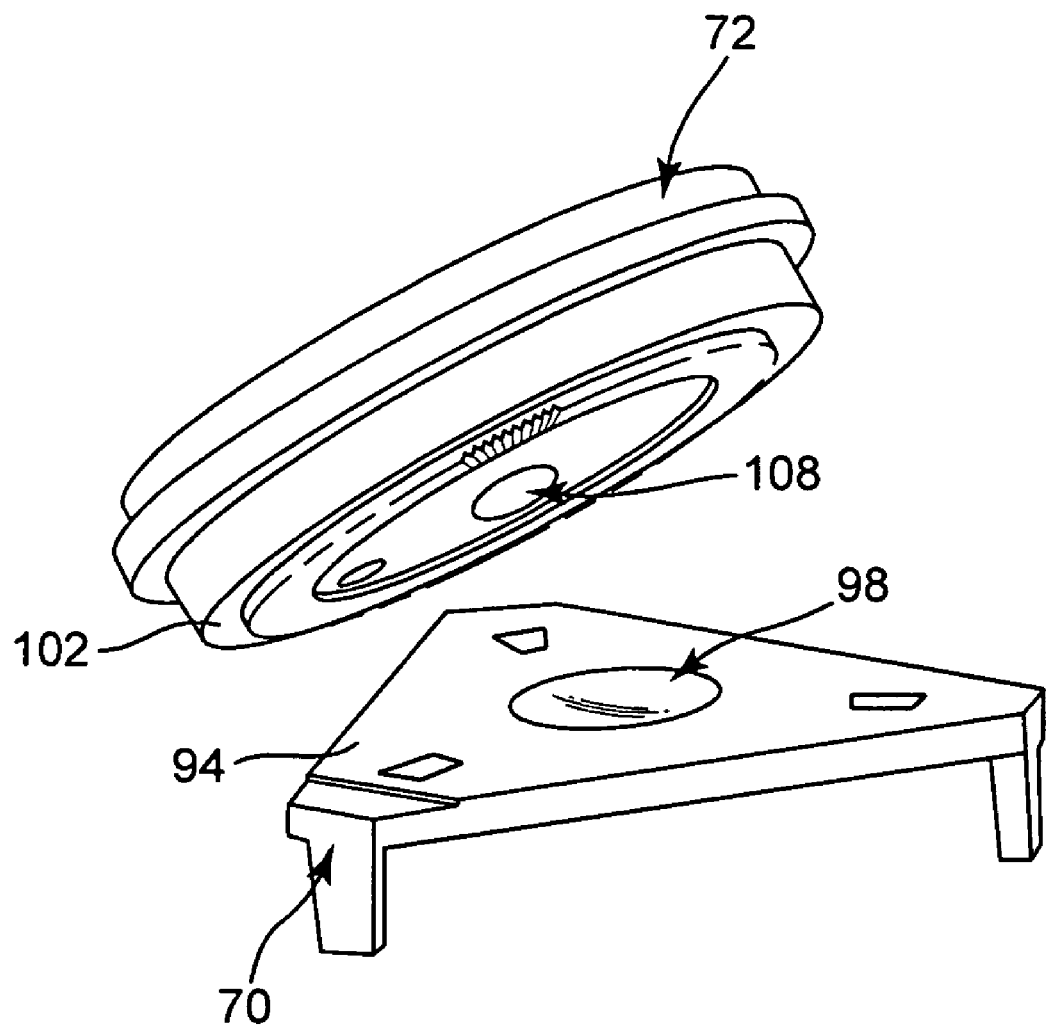
FIG. 6 illustrates a perspective view of components of a brake assembly according to one embodiment of the present invention.

FIG. 6 illustrates a perspective view of the brake plate 70 oriented relative to the brake button 72 according to one embodiment of the present invention. In this regard, the brake button 72 is shown suspended above and non-aligned with the brake plate 70 to illustrate the protruding member 108 relative to the depression 98. When properly aligned and operably assembled, the cover side 94 of the brake plate 70 is adjacent the hub side 102 of the brake button 72. In this manner, the depression 98 formed by the brake plate 70 is configured to receive the protruding member 108 of the brake button 72.

Figure 7:
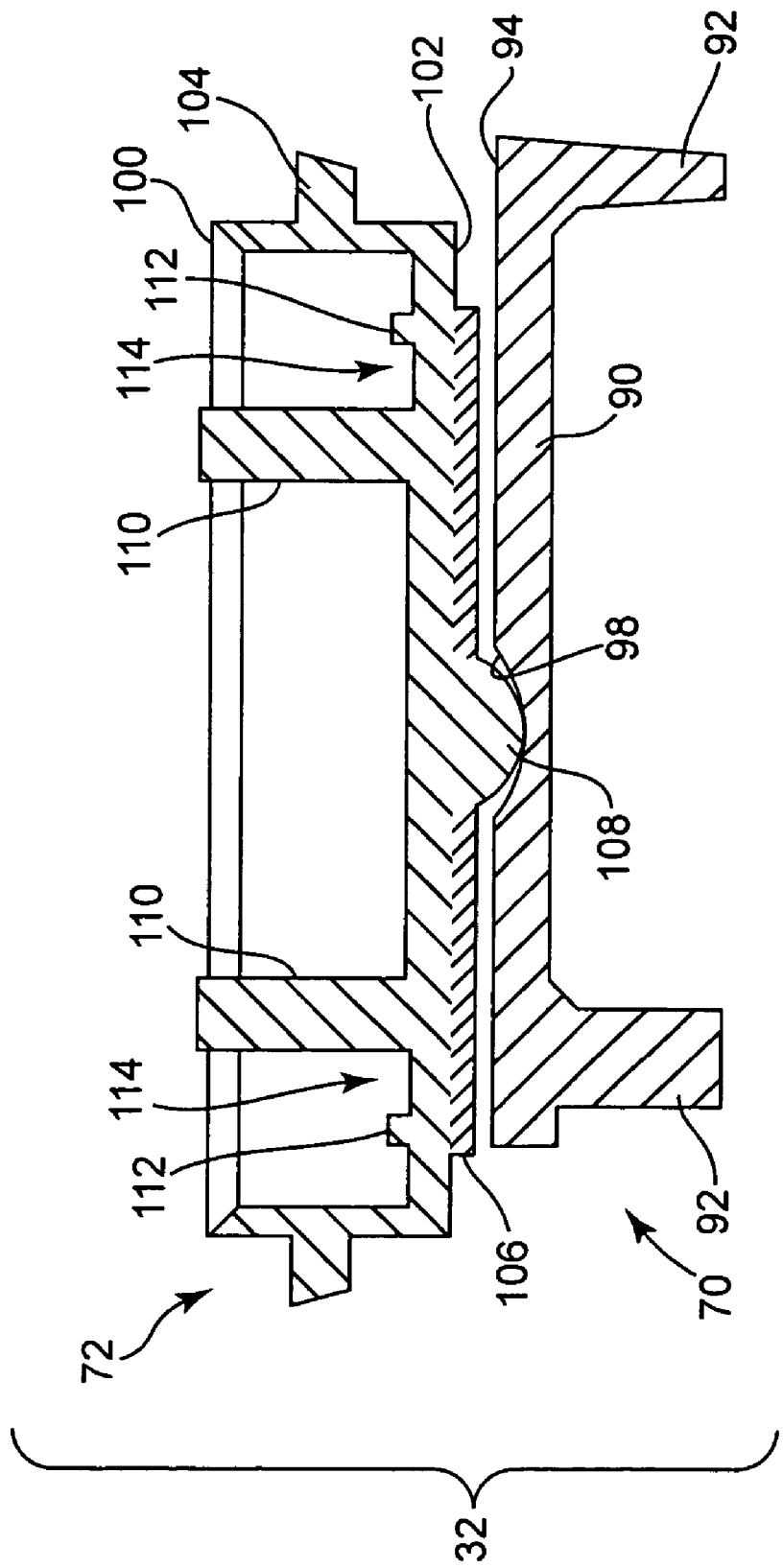
FIG. 7 illustrates a cross-sectional view of an aligned and operably assembled brake assembly not including a spring and according to one embodiment of the present invention.

FIG. 7 illustrates a cross-sectional view of a properly aligned and operably assembled brake assembly 32 with the spring 74 (FIG. 1) not shown for ease of illustration.

In a preferred embodiment, the platen 90 defines a concave hemi-spherical depression 98 that is slightly larger than the convex hemi-spherical protruding member 108 on the brake button 72. When the brake plate 70 and the brake button 72 are coaxially aligned, the protruding member 108 is received within the depression 98 in a stable, equilibrating orientation.

For example, the depression 98 defines a radius $R_P$ (FIG. 3) that is greater than the radius $R_B$ (FIG. 5) of the protruding member 108. In this manner, a majority of an exterior surface of the protruding member 108 is received by the depression 98 such that any lateral rocking motions of the brake button 72 relative to the brake plate 70 are constrained by, and thus dampened, by the brake plate 70 depression 98. Thus, the depression 98 forms a trough or a well that dampens movement of the brake button, and in particular movement of the protruding member 108, such that vibrations are minimized and/or greatly reduced (as is any possible relative motion between the brake plate 70 and the brake button 72). In other words, the depression 98 forms a trough or a well that defines a low potential energy state for the protruding member 108, such that relative motion between the brake plate 70 and the brake button 72 is dampened/reduced.

Figure 8:
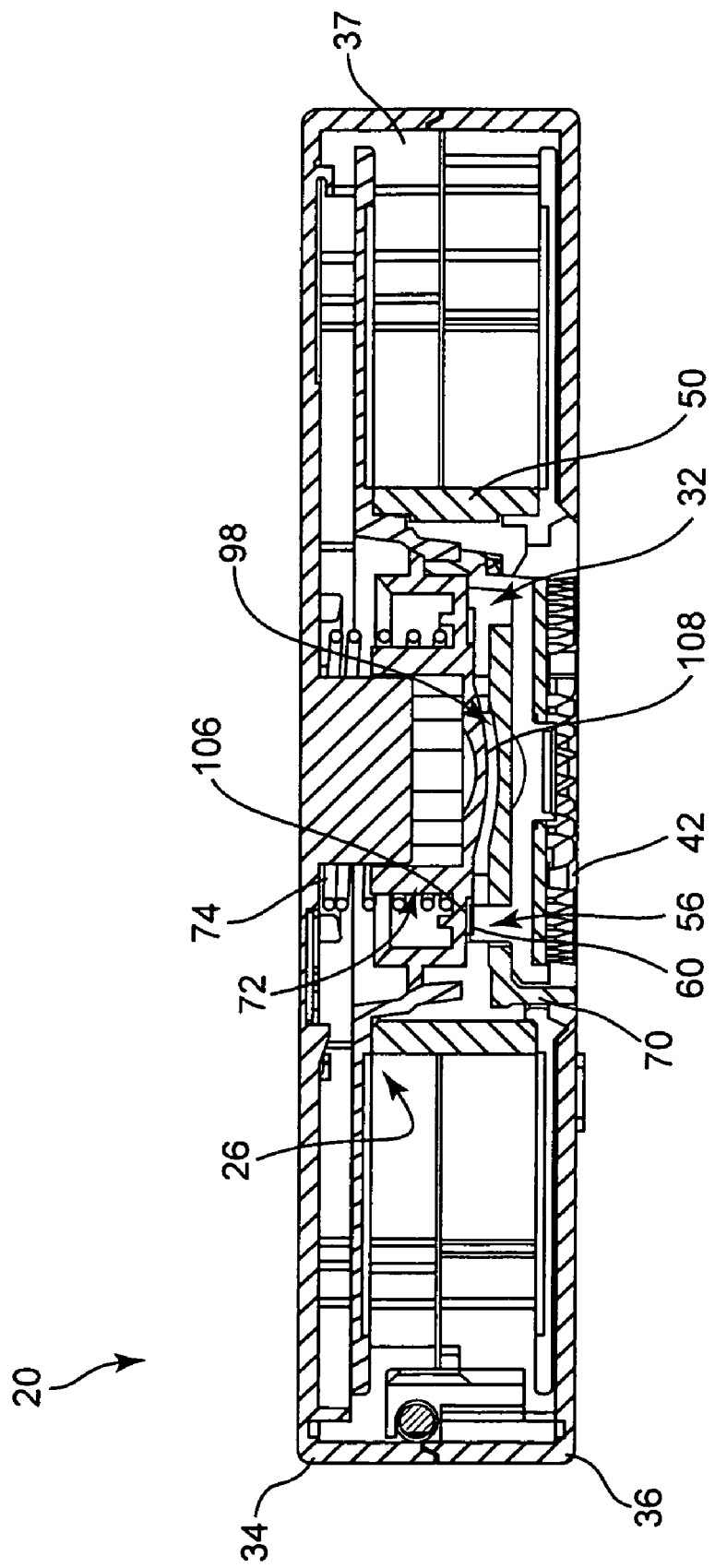
FIG. 8 illustrates a cross-sectional view of an assembled data storage tape cartridge according to one embodiment of the present invention.

FIG. 8 illustrates a cross-sectional view of an assembled data storage tape cartridge 20 according to one embodiment of the present invention. The cartridge 20 is in an "in-hand" configuration ready for insertion into a tape drive (not shown) for read/write processing.

The brake assembly 32 is engaged with the tape reel assembly 26 such that the tape reel assembly 26 cannot rotate or move axially. In this manner, the tape reel assembly 26 is "locked" and the brake assembly 32 is in a "locked position," which is the case whenever the data storage tape cartridge 20 is not in a tape drive (i.e., the cartridge 20 is in hand). For ease of illustration, the storage tape 28 (FIG. 1) has been omitted from the view of FIG. 5A.

The hub 50 of the tape reel assembly 26 and the brake assembly 32 are axially aligned with the opening 42. As assembled, the brake plate 70 and the brake button 72 are disposed within the hub 50, and the coiled spring 74 is disposed co-axially about the brake button 72.

The coiled spring 74 biases the brake button into the tape reel assembly 26 such that the engagement surface(s) 60 of the brake posts 56 are mated with the brake surface 106 of the brake button 72. To this end, the brake button 72 impedes rotation of the tape reel assembly 26, and the cartridge 20 is locked.

As a point of reference, the data storage tape cartridge 20 is shown readied for insertion into and as a part of a tape drive system (not shown), where the tape drive system would include the data storage tape cartridge 20 and a motor-driven drive clutch. During use, the cartridge 20 is inserted into the tape drive and the drive clutch engages with the brake assembly 32. More particularly, the drive clutch raises the brake plate 70 up and along the brake posts 56 (approximately 0.090 inches) until the brake surface 106 of the brake button 72 is disengaged from the brake posts 56. Consequently, the depression 98 contacts the protruding member 108 as the risen brake plate 70 disengages the brake button 72 from the hub 50. Thus, the tape reel assembly is "unlocked" and the configured for rotation in a read/write process.

During a read/write process, the brake plate 70 rotates under the influence of the drive clutch. In this regard, the brake plate 70 and the brake button 72 comprise rotating wear components within the cartridge 20. With additional reference to FIG. 7, the depression 98 of the rotating brake plate 70 combines with the protruding member 108 of the brake button 72 to dampen vibrations caused by eccentricities within the tape reel assembly 26/brake assembly 32. In particular, eccentricities caused, for example, by a slight mis-alignment of the cartridge 20 within the tape drive, or by variations in mass distribution within the tape reel assembly 26, might cause lateral motion (i.e., wobbling) of the brake plate 70. However, the incidence of lateral motion in the rotating brake plate 70 is quelled, or dampened, by the interaction of the protruding member 108 within the depression 98. Thus, vibration of the components of the cartridge 20 during read/write processing is greatly reduced or eliminated (since the relative motion of the rotating wear components is reduced or eliminated) through the interaction of the brake plate 70 and the brake button 72.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A data storage tape cartridge comprising:
   a housing including a base and a cover combined to define an enclosed region, the base defining a central opening;
   at least one tape reel assembly rotatably disposed within the enclosed region;
   a storage tape wound about a tape winding surface of the tape reel assembly; and
   a brake assembly aligned with the central opening and nested between the tape reel assembly and the cover, the brake assembly including:
      a brake button defining a hub side including a protruding member,
      a brake plate defining a cover side defining a depression;
   wherein the brake plate is separated from the brake button in the locked position, and when the brake assembly is in an unlocked position, the depression of the brake plate mates with the protruding member of the brake button to limit vibration of the brake assembly.

2. The data storage tape cartridge of claim 1, wherein the protruding member defines a convex hemi-spherical surface including a first radius of curvature, and further wherein the depression defines a concave hemi-spherical surface including a second radius of curvature not equal to the first radius of curvature.

3. The data storage tape cartridge of claim 1, wherein the at least one tape reel assembly comprises a brake post and the brake plate defines a slot, the brake post insertable through the slot to engage with the brake button in a locked position.

4. A brake assembly for a data storage tape cartridge, the brake assembly comprising:
   a brake button defining a convex protruding member; and
   a brake plate defining a concave depression sized to receive the convex protruding member;
   wherein the concave depression defines a radius of curvature that is greater than a radius of curvature of the convex protruding member, the brake button and the brake plate are disengaged when the brake button is engaged with a tape reel of the data storage tape cartridge.

5. The brake assembly of claim 4, wherein the brake plate defines at least one through-hole sized to receive a brake post extending from the tape reel, the brake post insertable through the through-hole to engage with the brake button and displace the brake button away from the brake plate.

6. A data storage tape cartridge comprising:
   a housing including a base and a cover combined to define an enclosed region;
   a tape reel assembly rotatably disposed within the enclosed region and comprising a brake post;
   a storage tape retained by the tape reel assembly; and
   a brake assembly axially aligned with the tape reel assembly, the brake assembly including:
      a brake button defining a protruding member,
      a brake plate defining a depression and a slot;
      wherein the brake plate is spaced apart from the brake button when the brake post is inserted through the slot and engaged with the brake button, and the brake plate is movable to contact the brake button and disengage the brake button from the brake post.

7. The data storage tape cartridge of claim 6, wherein the brake plate and the brake button rotate during rotation of the tape reel assembly, the brake plate movable to mate the depression with the protruding member to limit vibration of the brake assembly during rotation of the tape reel assembly.

8. The data storage tape cartridge of claim 6, wherein a locked position of the tape reel assembly comprises the brake plate spaced apart from the brake button and the brake post inserted through the slot and engaged with the brake button.

9. The data storage tape cartridge of claim 6, wherein an unlocked position of the tape reel assembly comprises the brake plate contacting the brake button and the depression mated with the protruding member, the brake post disengaged from the brake button.

10. The data storage tape cartridge of claim 9, wherein the unlocked position of the tape reel assembly comprises the brake button moved away from the brake post.

11. The data storage tape cartridge of claim 6, wherein the tape reel assembly comprises a plurality of brake posts and the brake plate defines a plurality of slots, each slot configured to receive one of the plurality of brake posts.

* * * * *